(12) United States Patent
Daniel

(10) Patent No.: US 11,039,597 B2
(45) Date of Patent: Jun. 22, 2021

(54) ELECTRONIC ANIMAL FEEDING SYSTEM

(71) Applicant: ZAXE TECHNOLOGIES INC., Sainte-Julie (CA)

(72) Inventor: Robert Daniel, Farnham (CA)

(73) Assignee: ZAXE TECHNOLOGIES INC.

( * ) Notice: Subject to any disclaimer, the term of this patent is extended or adjusted under 35 U.S.C. 154(b) by 268 days.

(21) Appl. No.: 16/223,410

(22) Filed: Dec. 18, 2018

(65) Prior Publication Data

US 2020/0187452 A1 Jun. 18, 2020

(51) Int. Cl.
*A01K 5/02* (2006.01)

(52) U.S. Cl.
CPC .......... *A01K 5/0275* (2013.01); *A01K 5/0225* (2013.01)

(58) Field of Classification Search
CPC .. A01K 5/0225; A01K 5/0275; A01K 39/012; A01K 15/02; B67C 11/00
USPC ...................................................... 119/51.01
See application file for complete search history.

(56) References Cited

U.S. PATENT DOCUMENTS

| | | | | |
|---|---|---|---|---|
| 5,372,093 A * | 12/1994 | Pooshs | ................. | A01K 5/0291 119/51.11 |
| 7,222,583 B2 * | 5/2007 | Foster | .................... | A01K 61/80 119/57.91 |
| 8,074,602 B2 * | 12/2011 | Laliberte | .............. | A01K 5/0275 119/57.92 |
| 9,295,226 B2 * | 3/2016 | Brooks | ................. | A01K 5/0291 |
| 9,521,828 B2 * | 12/2016 | Brooks | ................. | A01K 5/0225 |
| 9,854,785 B2 * | 1/2018 | Fallis | ................... | A01K 5/0275 |
| 10,653,110 B2 * | 5/2020 | Pfeiff | .................... | A01K 5/0225 |
| 2005/0241588 A1 * | 11/2005 | Foster | .................. | A01K 5/0291 119/57.91 |
| 2010/0095895 A1 * | 4/2010 | Laliberta | .............. | A01K 5/0275 119/56.1 |
| 2011/0174224 A1 * | 7/2011 | Brooks | ................ | A01K 5/0275 119/57.92 |
| 2015/0068462 A1 * | 3/2015 | Brooks | .................. | A01K 61/80 119/51.11 |

(Continued)

FOREIGN PATENT DOCUMENTS

| | | |
|---|---|---|
| CA | 2712784 C | 11/2013 |
| CA | 2952227 A1 | 12/2015 |
| CA | 2858568 C | 9/2017 |

*Primary Examiner* — Magdalena Topolski
*Assistant Examiner* — Kevin M Dennis
(74) *Attorney, Agent, or Firm* — Lavery, De Billy, LLP; Gonzalo Lavin

(57) ABSTRACT

An animal feeder for use in an electronic animal feeding system comprising a computer controller, a feed storage, a feed delivery system, and at least one feeding station comprising the feeder, a bowl and an identifier, the feeder comprising a reservoir for receiving feed and comprising an agitator for agitating the feed inside the reservoir and a dosage tray, a motor assembly comprising a motor actuatable by the computer controller, the motor rotating the agitator and the dosage tray such that the dosage tray receives a pre-determined dosage of feed from the reservoir, the motor assembly further comprising a detector detecting the rotation of the dosage tray and communicating a rotation status to the computer controller, and a funnel assembly comprising an upper funnel transferring feed from the reservoir to the bowl, wherein an alarm is activatable by the computer controller if a blockage is detected by the detector.

14 Claims, 11 Drawing Sheets

(56) References Cited

U.S. PATENT DOCUMENTS

| | | | |
|---|---|---|---|
| 2015/0237825 A1* | 8/2015 | Fallis | A01K 1/0209 119/51.11 |
| 2017/0105388 A1* | 4/2017 | Pfeiff | H02P 1/18 |
| 2018/0263221 A1* | 9/2018 | Mark | A01K 39/012 |
| 2020/0146259 A1* | 5/2020 | Klocke | A01K 5/0241 |
| 2020/0267933 A1* | 8/2020 | Pfeiff | A01K 5/02 |

* cited by examiner

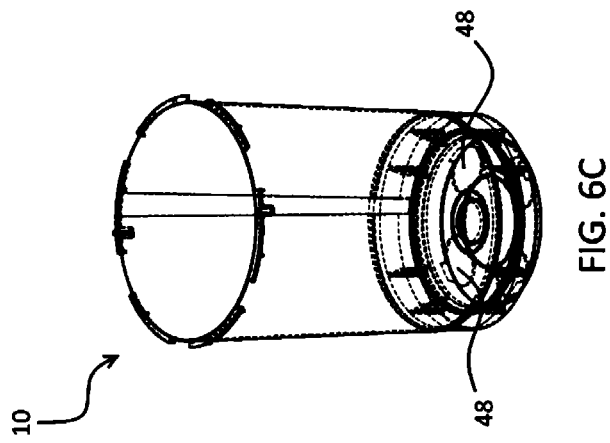
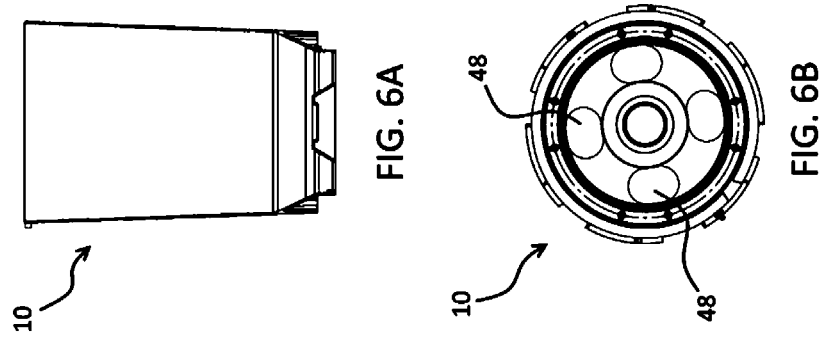

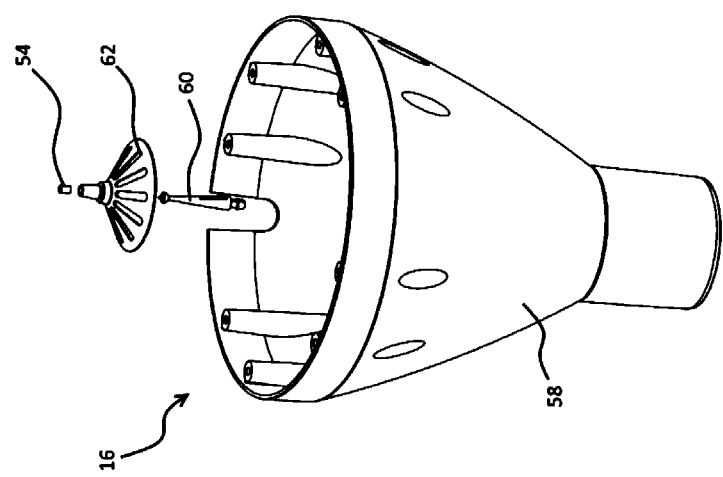
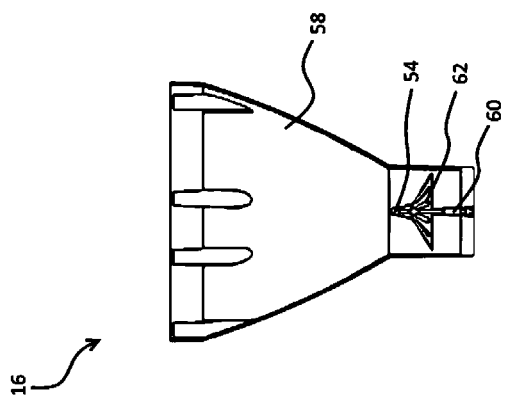
FIG. 8A
FIG. 8B

ELECTRONIC ANIMAL FEEDING SYSTEM

FIELD OF THE INVENTION

The present invention relates to an automatic animal feeding system, particularly for sows.

BACKGROUND OF THE INVENTION

A variety of electronic feeders exist to automatically identify and feed animals such as sows. Such systems often comprise individual feeding stations that can identify the animal for example via an identification transponder while preventing other animals from entering, provide a pre-determined amount of feed to the animal based on their individual meal plan and their consumption habits, and record the amount of feed consumed by the animal to provide appropriate feedback through a computer control system.

While a variety of methods exist to keep track of the amount of feed consumed by the animal, this data is often unreliable due to the common occurrence of feed bridging, as air pockets prevent the feed from flowing.

SUMMARY OF THE INVENTION

It is therefore a general object of the present invention to provide an electronic animal feeder that can accurately track the consumption habits of animals such as sows.

It is another object of the present invention to provide an efficient electronic animal feeder that optimizes the filling procedures of its feed reservoirs.

In order to address the above and other drawbacks, there is provided an animal feeder for use in an electronic animal feeding system comprising a computer controller, a central feed storage, a feed delivery system, and at least one individual feeding station comprising the animal feeder, a feeding bowl and an animal identifier, the animal feeder comprising a reservoir, the reservoir receiving feed from the feed delivery system, the reservoir comprising an agitator for agitating the feed inside the reservoir and a dosage tray, a motor assembly, the motor assembly comprising a motor actuatable by the computer controller, the motor rotating the agitator and the dosage tray such that the dosage tray receives a pre-determined dosage of feed from the reservoir, the motor assembly further comprising a detector for detecting the rotation of the dosage tray and communicating a status of the rotation of the dosage tray to the computer controller, and a funnel assembly comprising an upper funnel for transferring feed from the reservoir to the feeding bowl, wherein an alarm is activatable by the computer controller if a blockage is detected by the detector.

In an embodiment, the detector comprises a magnet tray comprising a plurality of magnets, the magnet tray rotatable with the dosage tray, the detector further comprising a first reed switch adjacent to the motor, the first reed switch aligned with the rotational path of the plurality of magnets, the detector further communicating a status of the rotation of the magnet tray to the computer controller.

In an embodiment, the motor assembly further comprises a second reed switch mounted underneath the motor and the funnel assembly further comprises a pin operatively coupled at its lower end to the outlet of the upper funnel, a deflector coupled to the upper end of the pin, and an additional magnet coupled to the upper end of the deflector, the additional magnet aligned with the second reed switch when the pin and the deflector are in a substantially upright position, the pin and the deflector tiltable when feed is flowing through the upper funnel, the pin and the deflector reverting to the substantially upright position after the feed ceases to flow, the second reed switch communicating a status of the deflector to the computer controller, wherein the alarm is activatable by the computer controller if a blockage is detected by the second reed switch.

In an embodiment, the funnel assembly further comprises a pin operatively coupled at its lower end to the outlet of the upper funnel and a deflector coupled to the upper end of the pin, the pin and the deflector in a substantially upright position when no feed is flowing, the pin and the deflector tiltable when feed is flowing through the upper funnel, the pin and the deflector reverting to their substantially upright position after the feed ceases to flow, wherein the alarm is activatable by the computer controller if a blockage is detected by one of doppler effect detection, capacitive proximity sensor detection, laser light flow detection, or microwave sensor detection.

In an embodiment, the animal feeder further comprises a cap assembly, the cap assembly covering the reservoir and transferring feed from the feed delivery system to the reservoir, the cap assembly comprising a feed shut-off engageable by the computer controller.

In an embodiment, the motor assembly further comprises an amperage meter for detecting a drawn current by the actuating motor, the amperage meter communicating the drawn current to the computer controller, the computer controller comparing the drawn current to a drawn current threshold to determine the quantity of feed remaining in the reservoir.

In an embodiment, the funnel assembly further comprises a lower funnel for diverting feed from the upper funnel to the feeding bowl.

In an embodiment, the animal feeder further comprises a computer storage operatively connected to the computer controller, the computer storage comprising data selected from at least one of animal identification information, a plurality of individual feeding programs, and motor current thresholds.

The present disclosure also provides an electronic feeding system comprising a computer controller, a central feed storage, a feed delivery system, at least one individual feeding station comprising an animal feeder, a feeding bowl and an animal identifier, the animal feeder comprising a reservoir, the reservoir receiving feed from the feed delivery system, the reservoir comprising an agitator for agitating the feed inside the reservoir and a dosage tray, a motor assembly, the motor assembly comprising a motor actuatable by the computer controller, the motor rotating the agitator and the dosage tray such that the dosage tray receives a pre-determined dosage of feed from the reservoir, the motor assembly further comprising a detector for detecting the rotation of the dosage tray and communicating a status of the rotation of the dosage tray to the computer controller, and a funnel assembly comprising an upper funnel for transferring feed from the reservoir to the feeding bowl, and an alarm, the alarm activatable by the computer controller if a blockage is detected by the detector.

In an embodiment, the detector comprises a magnet tray comprising a plurality of magnets, the magnet tray rotatable with the dosage tray, the detector further comprising a first reed switch adjacent to the motor, the first reed switch aligned with the rotational path of the plurality of magnets, the detector further communicating a status of the rotation of the magnet tray to the computer controller.

In an embodiment, the motor assembly further comprises a second reed switch mounted underneath the motor and the funnel assembly further comprises a pin operatively coupled at its lower end to the outlet of the upper funnel, a deflector coupled to the upper end of the pin, and an additional magnet coupled to the upper end of the deflector, the additional magnet aligned with the second reed switch when the pin and the deflector are in a substantially upright position, the pin and the deflector tiltable when feed is flowing through the upper funnel, the pin and the deflector reverting to the substantially upright position after the feed ceases to flow, the second reed switch communicating a status of the deflector to the computer controller, wherein the alarm is activatable by the computer controller if a blockage is detected by the second reed switch.

In an embodiment, the funnel assembly further comprises a pin operatively coupled at its lower end to the outlet of the upper funnel and a deflector coupled to the upper end of the pin, the pin and the deflector in a substantially upright position when no feed is flowing, the pin and the deflector tiltable when feed is flowing through the upper funnel, the pin and the deflector reverting to their substantially upright position after the feed ceases to flow, wherein the alarm is activatable by the computer controller if a blockage is detected by one of doppler effect detection, capacitive proximity sensor detection, laser light flow detection, or microwave sensor detection.

In an embodiment, the electronic feeding system further comprises a cap assembly, the cap assembly covering the reservoir and transferring feed from the feed delivery system to the reservoir, the cap assembly comprising a feed shut-off engageable by the computer controller.

In an embodiment, the motor assembly further comprises an amperage meter for detecting a drawn current by the actuating motor, the amperage meter communicating the drawn current to the computer controller, the computer controller comparing the drawn current to a drawn current threshold to determine the quantity of feed remaining in the reservoir.

In an embodiment, the funnel assembly further comprises a lower funnel for diverting feed from the upper funnel to the feeding bowl.

In an embodiment, the electronic feeding system further comprises a computer storage operatively connected to the computer controller, the computer storage comprising data selected from at least one of animal identification information, a plurality of individual feeding programs, and motor current thresholds.

The present disclosure also provides a computer-readable storage medium having computer-readable code embedded therein, which, when loaded in and executed by a computing device, causes the computing device to perform the steps of receiving identification data of an animal entering an individual animal feeding station, retrieving a remaining daily allotment of feed for the animal from a computer storage, if the remaining daily allotment of feed for the animal is higher than zero, transmitting an actuation signal to a motor assembly comprising a motor to provide a dosage of the remaining daily allotment of feed from a reservoir to the animal through a funnel assembly, receiving feed consumption data from a detector, the detector detecting the rotation of a dosage tray, the dosage tray rotating with the motor, updating the remaining daily allotment of feed for the animal, if a blockage is detected by the detector, activating an alarm to alert a user of the blockage, receiving a volume of remaining feed in the reservoir from an amperage meter measuring the drawn current of the motor; and if the remaining feed is below a predetermined amount, transmitting a signal to a feed delivery system to provide additional feed to the reservoir.

In an embodiment, the detector comprises a magnet tray comprising a plurality of magnets, the magnet tray rotatable with the dosage tray, the detector further comprising a first reed switch adjacent to the motor, the first reed switch aligned with the rotational path of the plurality of magnets, the detector further communicating a status of the rotation of the magnet tray to the computing device.

In an embodiment, the motor assembly further comprises a second reed switch mounted underneath the motor and the funnel assembly comprises a pin operatively coupled at its lower end to the outlet of an upper funnel, a deflector coupled to the upper end of the pin, and an additional magnet coupled to the upper end of the deflector, the additional magnet aligned with the second reed switch when the pin and the deflector are in a substantially upright position, the pin and the deflector tiltable when feed is flowing through the upper funnel, the pin and the deflector reverting to the substantially upright position after the feed ceases to flow, the second reed switch communicating a status of the deflector to the computing device, wherein the alarm is activatable by the second reed switch.

In an embodiment, the funnel assembly further comprises a pin operatively coupled at its lower end to the outlet of an upper funnel and a deflector coupled to the upper end of the pin, the pin and the deflector in a substantially upright position when no feed is flowing, the pin and the deflector tiltable when feed is flowing through the upper funnel, the pin and the deflector reverting to the substantially upright position after the feed ceases to flow, wherein the alarm is activatable by the computing device if a blockage is detected by one of doppler effect detection, capacitive proximity sensor detection, laser light flow detection, or microwave sensor detection.

BRIEF DESCRIPTION OF THE DRAWINGS

FIGS. 6A, 6B and 6C are respective front, top and perspective views of a reservoir for an electronic animal feeding system, in accordance with an illustrative embodiment of the present invention;

FIGS. 8A and 8B are respective front and exploded perspective views of a funnel assembly for an electronic animal feeding system, in accordance with an illustrative embodiment of the present invention;

DETAILED DESCRIPTION OF THE ILLUSTRATIVE EMBODIMENTS

Figure 1:
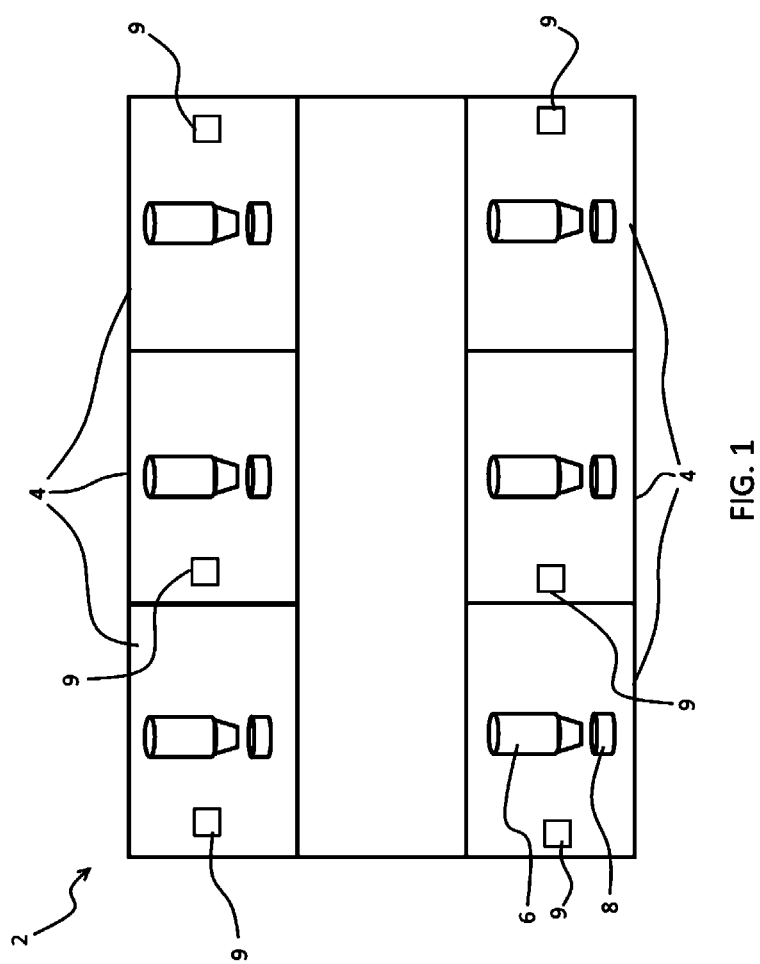
FIG. 1 is a plan view of an electronic animal feeding system, in accordance with an illustrative embodiment of the present invention.

Referring to FIG. 1, there is shown an electronic animal feeding system, generally referred to using the reference numeral 2, in accordance with an illustrative embodiment of the present invention. The electronic animal feeding system 2 includes at least one individual feeding station 4, each individual feeding station 4 comprising an electronic animal feeder 6, a feeding bowl 8 and an animal identifier 9. While FIG. 1 illustratively shows an electronic animal feeding system 2 with six individual feeding stations 4, a person of skill in the art would understand that the electronic animal feeding system 2 may comprise any number of individual feeding stations 4 depending on the number of animals such as sows that need to be fed and the available space. As will be discussed in further detail below, each individual feeding station 4 may accommodate one sow at a time for feeding. Upon entering an individual feeding station 4, an entrance gate (not shown) locks behind the sow and the sow is identified by the animal or sow identifier 9, for example via a transponder tag such as RFID in the sow's ear. Based on the sow's individual feeding plan, a specific amount of feed (not shown) is dispensed from the electronic sow feeder 6 into the feeding bowl 8, as will be discussed in further detail below. The sow may leave the individual feeding station 4 at any time, allowing another sow to enter. The entrance gate remains closed while a sow is feeding and optionally for several minutes after the sow exits to prevent other sows from entering until it is their turn to receive feed.

Figure 2B:
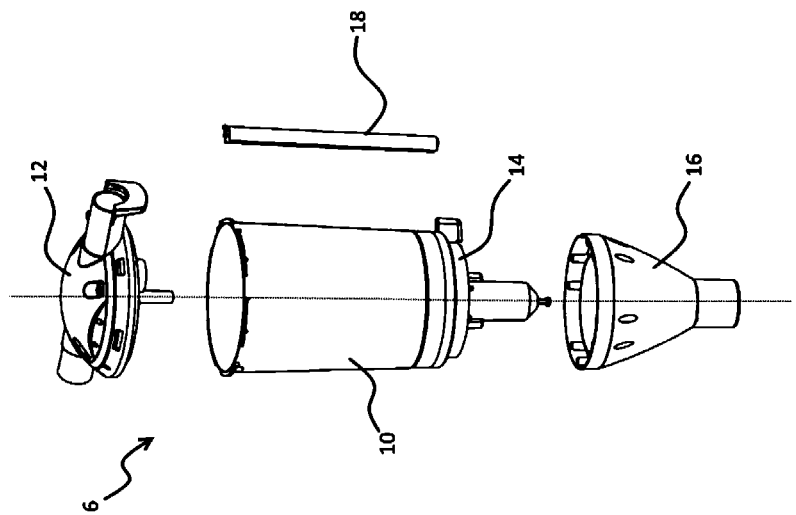
FIGS. 2A and 2B are respective perspective and exploded perspective views of an electronic animal feeder for an electronic animal feeding system, in accordance with an illustrative embodiment of the present invention.
Figure 2A:
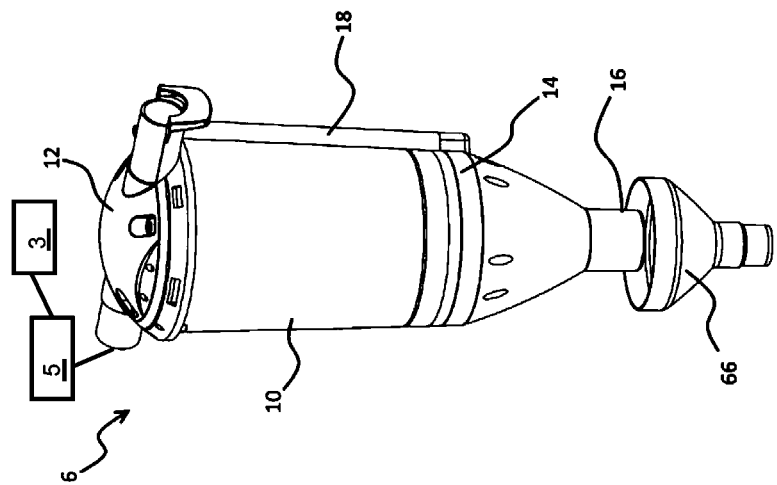

Referring now to FIGS. 2A and 2B, each electronic sow feeder 6 comprises a reservoir 10 for storing feed to be provided to a sow. A cap assembly 12 covers the reservoir 10 and receives feed from a central feed storage 3 via a feed delivery system 5, as will be discussed in further detail below. A motor assembly 14 is operatively connected to the lower end of the reservoir 10. Motor assembly 14 is configured to dispense feed from the reservoir 10 through a funnel assembly 16 to the feeding bowl 8, as discussed in further detail below. In addition, a wire cover 18 may be used to cover a wire (not shown) that transfers data throughout the system 2.

Figure 3B:
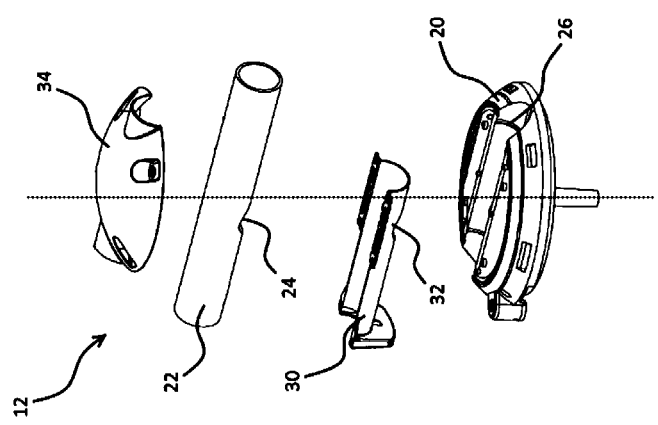
FIGS. 3A and 3B are respective front and exploded perspective views of a cap assembly for an electronic animal feeding system, in accordance with an illustrative embodiment of the present invention.
Figure 3A:
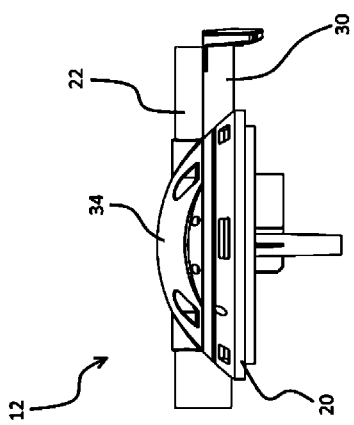
Figure 4B:
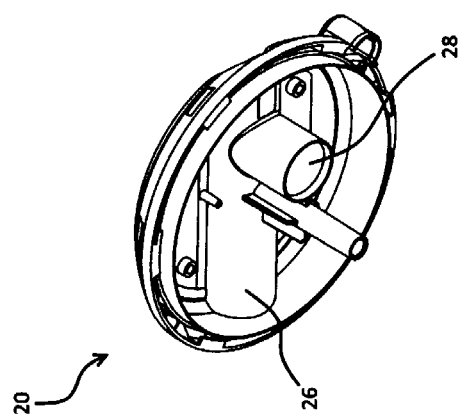
FIGS. 4A and 4B are respective top and lower perspective views of a cover for an electronic animal feeding system, in accordance with an illustrative embodiment of the present invention.
Figure 4A:
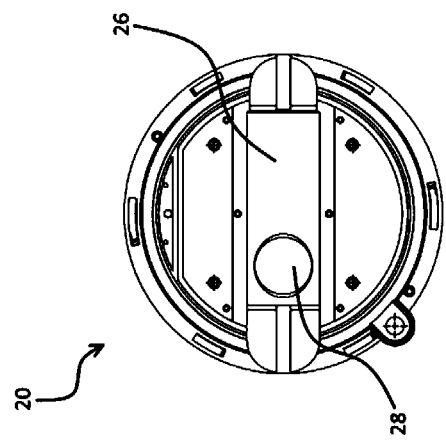

Referring now to FIGS. 3A and 3B, cap assembly 12 comprises a cover 20 that is placeable on an upper surface of each reservoir 10. Cover 20 encloses the reservoir 10 and allow feed to enter the reservoir 10. Feed is transported to the reservoir 10 from the central feed storage through a tube 22 comprising a plurality of tube cutouts 24 at various locations on the underside of the tube 22 such that the feed may pass from the tube 22 to the reservoir 10. Referring additionally to FIGS. 4A and 4B, cover 20 comprises a channel 26 for receiving the tube 22 and a cover outlet 28 allowing the feed to pass from a corresponding cutout 24 of the tube 22 to the reservoir 10. Cap assembly 12 further comprises a feed shut-off 30 comprising a shut-off cutout 32.

Based on the amount of feed in reservoir 10, feed shut-off 30 is slideable within channel 26 to either allow or prevent feed from passing from the tube 22 to the reservoir 10. Detection of feed levels in the reservoir and activation of the feed shut-off 30 may be carried out by a computer controller, as will be discussed in further detail below. In addition, cap assembly 12 comprises a cap 34 for enclosing the cap assembly 12.

Figure 5A:
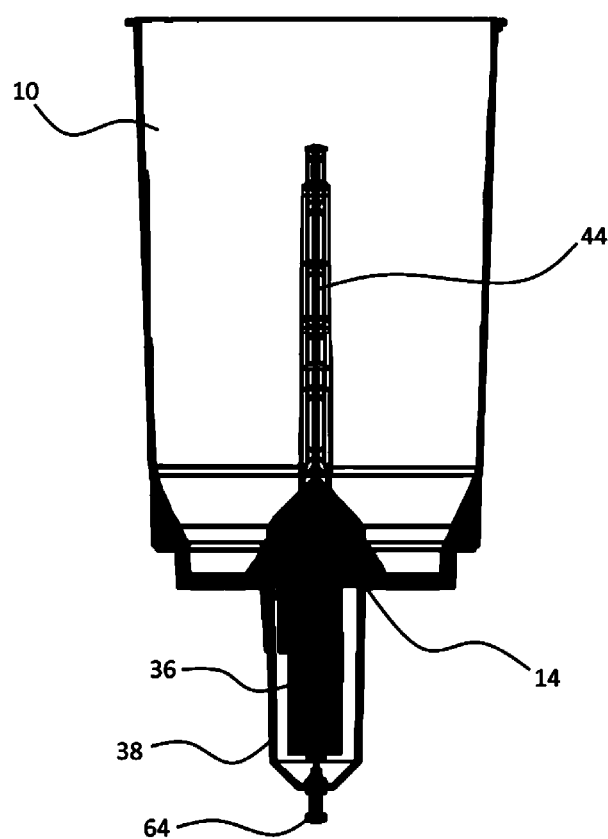
FIGS. 5A and 5B are respective front and exploded perspective views of a reservoir and motor assembly for an electronic animal feeding system, in accordance with an illustrative embodiment of the present invention.
Figure 5B:
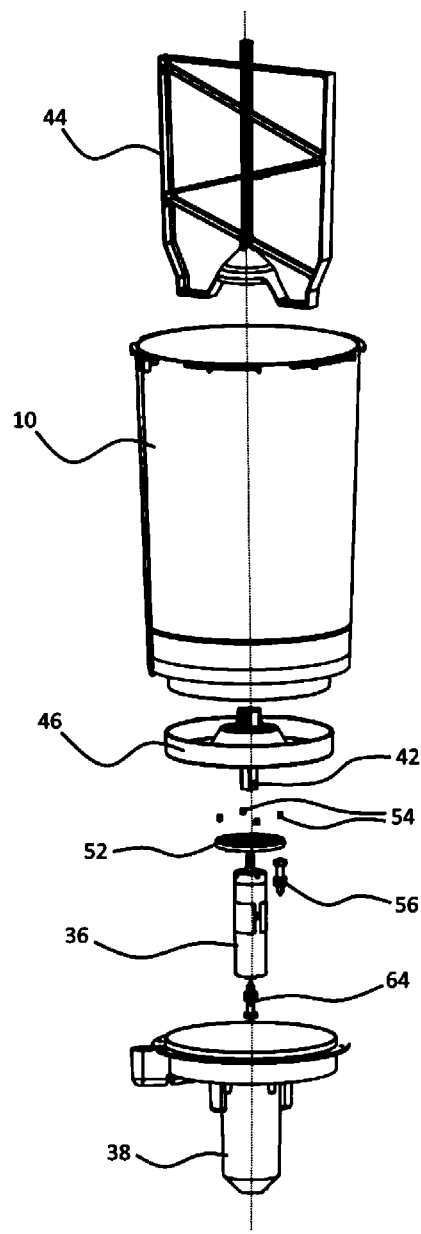
Figure 7:
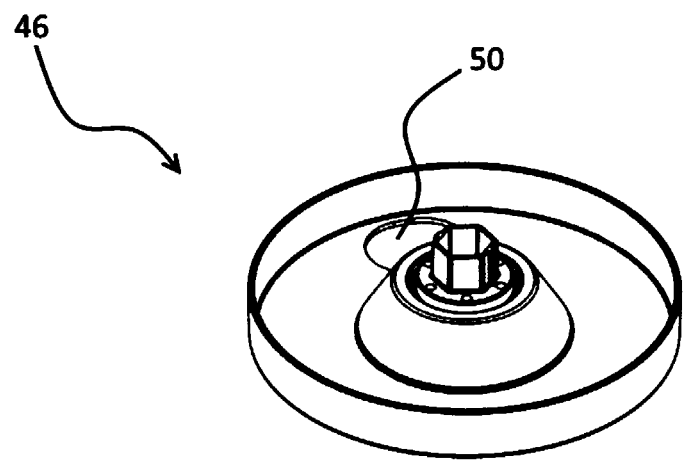
FIG. 7 is a perspective view of a dosage tray for an electronic animal feeding system, in accordance with an illustrative embodiment of the present invention.

Referring now to FIGS. 5A and 5B, motor assembly 14 comprises a motor 36, illustratively an electric motor, contained in a motor housing 38 that is actuatable to deliver feed from the reservoir 10 to the feeding bowl 8. Actuation of the motor 36 is done by the computer controller, as will be discussed in further detail below. As motor 36 is actuated, a motor shaft 40 rotatably engages a motor keyway 42 which simultaneously rotates both an agitator 44 inside the reservoir 10 and a dosage tray 46 positioned below the reservoir 10. Referring additionally to FIGS. 6A-6C and 7, reservoir 10 comprises a plurality of reservoir outlets 48, illustratively four reservoir outlets 48, and dosage tray 46 comprises a dosage tray cutout 50. As motor 36 actuates, agitator 44 rotates and agitates the feed inside the reservoir 10 such that the feed drops through the reservoir outlets 48 into the dosage tray 46. As a sufficient quantity of feed enters dosage tray 46, dosage tray cutout 50 is rotated such that the feed may drop into the funnel assembly 16 and into the feeding bowl 8, as discussed in further detail below. In addition, the agitation of the feed provided by the rotation of agitator 44 prevents feed bridging.

Still referring to FIGS. 5A and 5B, motor assembly 14 may further comprise a magnet tray 52 comprising a plurality of magnets 54, illustratively four magnets 54. Magnet tray 52 is illustratively positioned between the motor 36 and the dosage tray 46 and is configured to rotate along with the agitator 44 and the dosage tray 46. Motor assembly 14 further comprises a first detector, illustratively a first reed switch 56, positioned adjacent to the motor 36 and aligned with the rotational path of the plurality of magnets 54. As will be discussed in further detail below, the first reed switch 56 is operatively connected to the computer controller to provide information regarding the rotation of the dosage tray 46. Indeed, as the magnet tray 52 rotates, the magnets 54 come in and out of contact with the first reed switch 56. As such, the reed switch 56 may detect when a full revolution of the magnet tray 52 and thus the dosage tray 46 occurs, and thus how much feed has been provided. Conversely, the first reed switch 56 may also detect a blockage in the electronic sow feeder 6, for example if the magnet tray 52 fails to complete a full revolution despite the motor 36 being instructed to actuate as such.

Referring now to FIGS. 8A and 8B in addition to FIGS. 2A, 2B, 5A and 5B, funnel assembly 16 comprises an upper funnel 58 operatively coupled to the motor assembly 14. Funnel assembly 16 further comprises a pin 60 fixedly coupled to the outlet of the upper funnel 58 at one end and connected to a deflector 62 at its other end such that the deflector 62 is tiltable in any direction. The pin 60 and deflector 62 are weighted such that they will revert back to their upright position if no load is applied. An additional magnet 54 is positioned at the top end of deflector 62 and is aligned with a second reed switch 64 positioned underneath the motor 36. When no feed is flowing through the feeder 6, the second reed switch 64 detects the presence of the additional magnet 54 and may inform the computer controller as such, as will be described in further detail below. When feed is flowing through the feeder 6, the flow of the feed tilts the deflector 62 such that the additional magnet 54 is no longer in contact with the second reed switch 64. When the feed is no longer flowing, the deflector 62 reverts back to its upright position such that the additional magnet 54 reenters into contact with the second reed switch 64. As such, if a blockage were to occur, the second reed switch 64 will not detect the magnet 54 and will alert the computer controller of such a blockage, as will be described in further detail below. In addition, as seen in FIG. 2A, funnel assembly 16 may further comprise a lower funnel 66 configured to deposit feed exiting from the upper funnel 58 to the feeding bowl 8.

Still referring to FIGS. 8A and 8B, the magnetic detection of feed flow via second reed switch 64 and additional magnet 54 ensures the dependability, durability and cost effectiveness of the animal feeder 6. Magnetic detection is not hindered by any inconsistencies or different types of feeds that may be used. Further, magnetic detection is contact-free, so it will not be affected by the feed's dust and abrasiveness. In an alternate embodiment, rather than detecting the flow of feed by the second reed switch 64 and the additional magnet 54 positioned on top of deflector 62, the flow of feed may be detected by alternate detection methods such as doppler effect detection, capacitive proximity sensor detection, laser light flow detection, and microwave sensor detection.

Figure 9:
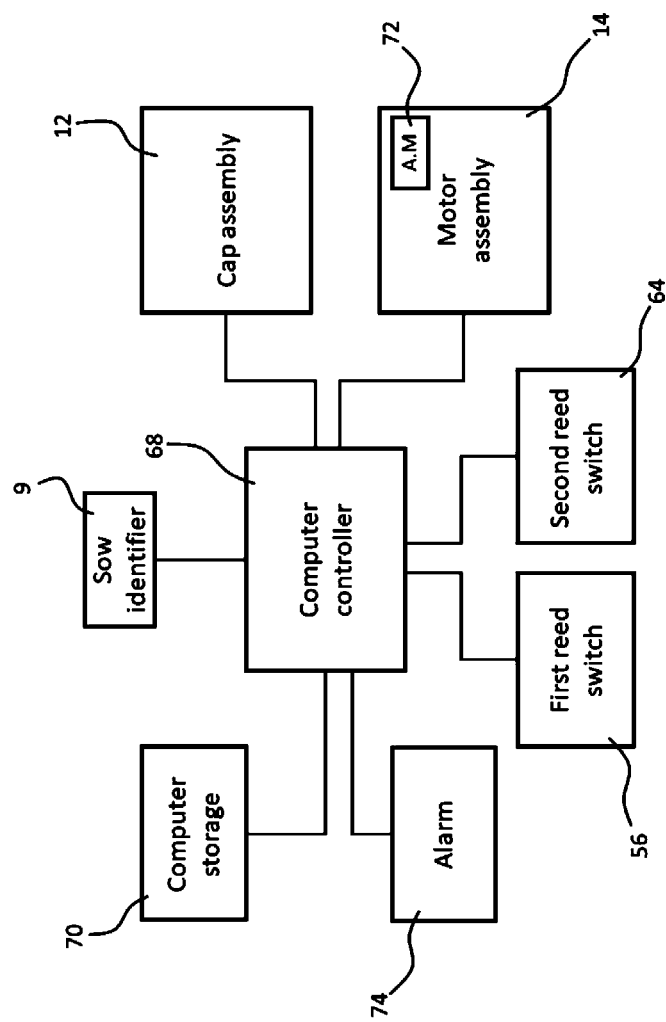
FIG. 9 is a schematic view of a computer controller for an electronic animal feeding system and the various components that interact with the computer controller, in accordance with an illustrative embodiment of the present invention.

Referring now to FIG. 9, cap assembly 12 and motor assembly 14 may communicate with computer controller 68, for example via a wired or wireless connection, such that they are controllable by computer controller 68. Further, as discussed above, when a sow enters one of the individual feeding stations 4, the sow identifier 9 identifies the sow and communicates this information to the computer controller 68, for example via a wired or wireless connection. Computer controller 68 then accesses information for the sow in question from computer storage 70, which stores an individual feeding program for each sow including a daily allotment of feed. If the sow who enters an individual feeding station 4 has not yet received the entirety of their daily allotment of feed, the computer controller 68 communicates with the motor assembly 14 to activate the motor 36, thus providing feed to the sow. As discussed above, first reed switch 56 may track the amount of feed being dispensed to a specific sow by tracking the rotations of the magnet tray 52. This information is communicated to the computer controller 68, for example via a wired or wireless connection, and the amount of feed dispensed to each sow is recorded in the computer storage 70 and may be subtracted from their daily allotment. Any undispensed allotment may be allocated to a subsequent entrance by the same sow that day, or to a subsequent day's feed. Feedback regarding any sow that fails to eat their daily allotment may be provided by means of an attention list generated by the computer controller 68 available to interested personnel at the end of each daily cycle and can be used to identify sows that may need additional care. On the other hand, once a sow has reached their daily allotment, computer controller 68 will not dispense any more feed to them that day.

Still referring to FIG. 9, in an embodiment, motor assembly 14 further comprises an amperage meter 72 that detects the drawn current by the motor 36 when actuating. In this embodiment, this drawn amperage is compared to a drawn current threshold stored in computer storage 70 containing the typical amperage required to run the motor 36 when the reservoir 10 is full of feed and the typical amperage required to run the motor 36 when the reservoir 10 is empty. Thus, if the amperage meter 72 detects that the reservoir 10 is either empty or contains less than a predetermined amount of feed, computer controller 68 may engage the feed shut-off 30 in cap assembly 12 such that feed may enter the reservoir 10 from the tube 22.

Still referring to FIG. 9, if a blockage is detected by at least one of the first reed switch 56 and the second reed switch 64, this information is communicated to the computer controller 68, for example via a wired or wireless connection, which may sound an alarm 74 to alert the interested personnel. As such, the locations of first reed switch 56 and second reed switch 64 provide blockage detection both inside the electronic sow feeder 6 and towards its point of exit.

Figure 10:
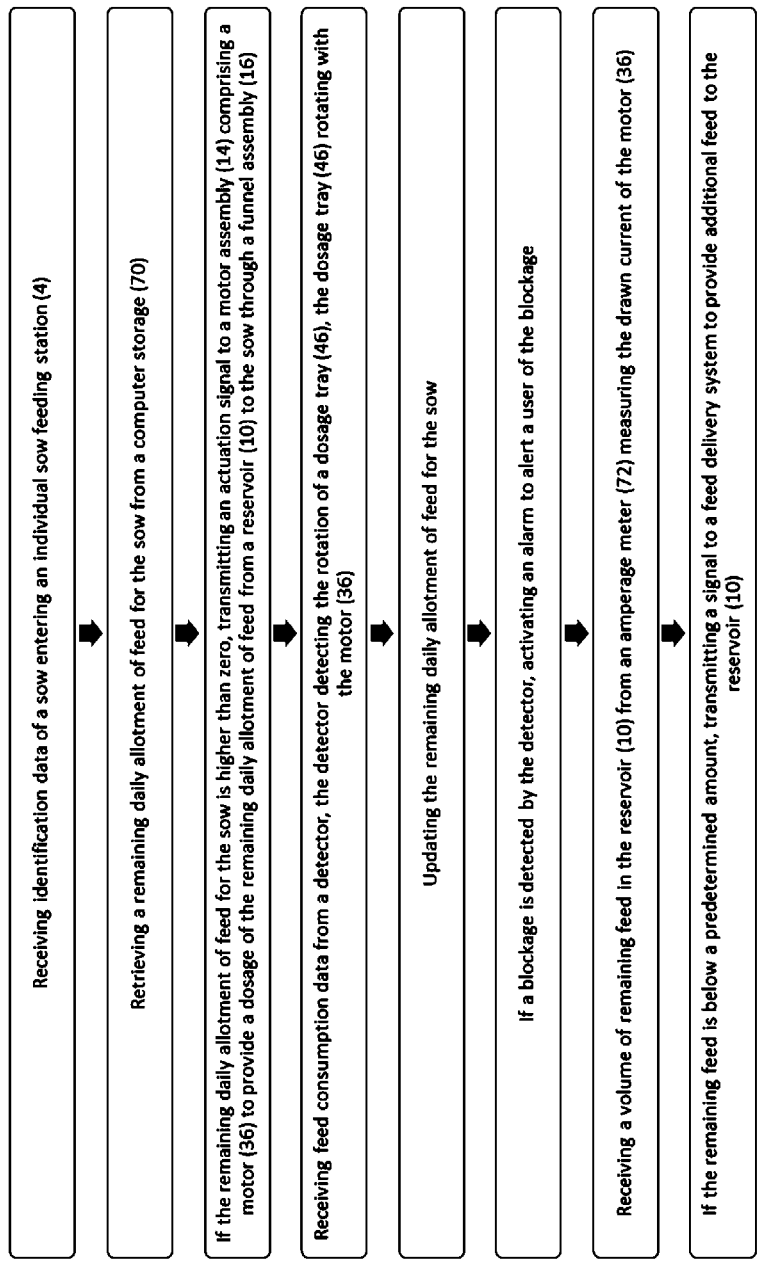
FIG. 10 is a flow chart of a process for a computer-readable code for controlling an electronic animal feeding system, in accordance with an illustrative embodiment of the present invention.

Referring now to FIG. 10, there is shown a computer-readable storage medium having computer-readable code embedded therein, which, when loaded in and executed by a computing device, causes the computing device to perform the following steps for controlling an electronic sow feeding system 2. Identification data of a sow entering an individual sow feeding station 4 is received. A remaining daily allotment of feed for the sow is retrieved from a computer storage 70. If the remaining daily allotment of feed for the sow is higher than zero, an actuation signal is transmitted to a motor assembly 14 comprising a motor 36 to provide a dosage of the remaining daily allotment of feed from a reservoir 10 to the sow through a funnel assembly 16. Feed consumption data is received from a detector, for example a first reed switch 56, the first reed switch 56 tracking the rotation of a magnet tray 52 underneath the reservoir 10. The remaining daily allotment of feed for the sow is updated based on the amount of feed consumed by the feed. If a blockage is detected by at least one of the first reed switch 56 and, in an embodiment, a second reed switch 64 aligned with a magnet 54 mounted to a tiltable deflector 62 that tilts when feed is being provided to the sow, an alarm is activated to alert a user of the blockage. A volume of remaining feed in the reservoir 10 is received from an amperage meter 72 measuring the drawn current of the motor 36. If the remaining feed is below a predetermined amount, a signal is transmitted to a feed delivery system to provide additional feed to the reservoir 10. In an alternate embodiment, blockage detection in the funnel assembly 16 may be done by one of doppler effect detection, capacitive proximity sensor detection, laser light flow detection, or microwave sensor detection.

The scope of the claims should not be limited by the preferred embodiments set forth in the examples, but should be given the broadest interpretation consistent with the description as a whole.

The invention claimed is:

1. An animal feeder (6) for use in an electronic animal feeding system (2) comprising a computer controller (68), a central feed storage, a feed delivery system, and at least one individual feeding station (4) comprising the animal feeder (6), a feeding bowl (8) and an animal identifier (9), the animal feeder (6) comprising:

a reservoir (10) for receiving feed from the feed delivery system, said reservoir (10) comprising an agitator (44) for agitating the feed inside said reservoir (10) and a dosage tray (46);

a motor assembly (14), said motor assembly (14) comprising a motor (36) actuatable by the computer controller (68), said motor rotating said agitator (44) and said dosage tray (46) such that said dosage tray (46) receives a pre-determined dosage of feed from said reservoir (10), said motor assembly (14) further comprising a detector for detecting a rotation of said dosage tray (46) and communicating a status of the rotation of said dosage tray (46) to the computer controller (68); and a funnel assembly (16) comprising an upper funnel (58) for transferring feed from said reservoir (10) to the feeding bowl (8);

wherein an alarm (74) is activatable by the computer controller (68) if a blockage is detected by said detector; and wherein said motor assembly (14) further comprises a second reed switch (64) mounted underneath said motor (36) and said funnel assembly (16) further comprises a pin (60) operatively coupled at a lower end thereof to an outlet of said upper funnel (58), a deflector (62) coupled to an upper end of said pin (60), and an additional magnet (54) coupled to an upper end of said deflector (62), said additional magnet (54) aligned with said second reed switch (64) when said pin (60) and said deflector (62) are in a substantially upright position, said pin (60) and said deflector (62) tiltable when feed is flowing through said upper funnel (58), said pin (60) and said deflector (62) reverting to said substantially upright position after the feed ceases to flow, said second reed switch (64) communicating a status of said deflector (62) to the computer controller (68), wherein said alarm (74) is activatable by said second reed switch (64).

2. The animal feeder (6) of claim 1, wherein said detector comprises a magnet tray (52) comprising a plurality of magnets (54), said magnet tray (52) rotatable with said dosage tray (46), said detector further comprising a first reed switch (56) adjacent to said motor (36), said first reed switch (56) aligned with a rotational path of said plurality of magnets (54), said detector further communicating a status of the rotation of said magnet tray (52) to the computer controller (68).

3. An animal feeder (6) for use in an electronic animal feeding system (2) comprising a computer controller (68), a central feed storage, a feed delivery system, and at least one individual feeding station (4) comprising the animal feeder (6), a feeding bowl (8) and an animal identifier (9), the animal feeder (6) comprising:

a reservoir (10) for receiving feed from the feed delivery system, said reservoir (10) comprising an agitator (44) for agitating the feed inside said reservoir (10) and a dosage tray (46);

a motor assembly (14), said motor assembly (14) comprising a motor (36) actuatable by the computer controller (68), said motor rotating said agitator (44) and said dosage tray (46) such that said dosage tray (46) receives a pre-determined dosage of feed from said reservoir (10), said motor assembly (14) further comprising a detector for detecting the a rotation of said dosage tray (46) and communicating a status of the rotation of said dosage tray (46) to the computer controller (68); and a funnel assembly (16) comprising an upper funnel (58) for transferring feed from said reservoir (10) to the feeding bowl (8);

wherein an alarm (74) is activatable by the computer controller (68) if a blockage is detected by said detector; and wherein said funnel assembly (16) further comprises a pin (60) operatively coupled at a lower end thereof to an outlet of said upper funnel (58) and a deflector (62) coupled to an upper end of said pin (60), said pin (60) and said deflector (62) in a substantially upright position when no feed is flowing, said pin (60) and said deflector (62) tiltable when feed is flowing through said upper funnel (58), said pin (60) and said deflector (62) reverting to said substantially upright position after the feed ceases to flow, wherein said alarm (74) is activatable by the computer controller (68) if the blockage is detected by one of doppler effect detection, capacitive proximity sensor detection, laser light flow detection, or microwave sensor detection.

4. The animal feeder (6) of claim 1 further comprising a cap assembly (12), said cap assembly (12) covering said reservoir (10) and transferring feed from the feed delivery system to said reservoir (10), said cap assembly (12) comprising a feed shut-off (30) engageable by the computer controller (68).

5. The animal feeder (6) of claim 1, wherein said motor assembly (14) further comprises an amperage meter (72) for detecting a drawn current by said actuating motor (36), said amperage meter (72) communicating said drawn current to the computer controller (68), said computer controller (68) comparing said drawn current to a drawn current threshold to determine a quantity of feed remaining in said reservoir (10).

6. The animal feeder (6) of claim 1, wherein said funnel assembly (16) further comprises a lower funnel (66) for diverting feed from said upper funnel (58) to the feeding bowl.

7. The animal feeder (6) of claim 5 further comprising a computer storage (70) operatively connected to the computer controller (68), said computer storage (70) comprising data selected from at least one of animal identification information, a plurality of individual feeding programs, or motor current thresholds.

8. An electronic feeding system (2) comprising:
a computer controller (68);
a central feed storage;
a feed delivery system;
at least one individual feeding station (4) comprising an animal feeder (6), a feeding bowl (8) and an animal identifier (9), said animal feeder (6) comprising:
  a reservoir (10) for receiving feed from said feed delivery system, said reservoir (10) comprising an agitator (44) for agitating the feed inside said reservoir (10) and a dosage tray (46);
  a motor assembly (14), said motor assembly (14) comprising a motor (36) actuatable by said computer controller (68), said motor rotating said agitator (44) and said dosage tray (46) such that said dosage tray (46) receives a pre-determined dosage of feed from said reservoir (10), said motor assembly (14) further comprising a detector for detecting a rotation of said dosage tray (46) and communicating a status of the rotation of said dosage tray (46) to the computer controller (68); and
  a funnel assembly (16) comprising an upper funnel (58) for transferring feed from said reservoir (10) to said feeding bowl (8); and
an alarm (74), said alarm (74) activatable by said computer controller (68) if a blockage is detected by said detector;
wherein said motor assembly (14) further comprises a second reed switch (64) mounted underneath said motor (36) and said funnel assembly (16) further comprises a pin (60) operatively coupled at a lower end thereof to an outlet of said upper funnel (58), a deflector (62) coupled to an upper end of said pin (60), and a magnet (54) coupled to an upper end of said deflector (62), said magnet (54) aligned with said second reed switch (64) when said pin (60) and said deflector (62) are in a substantially upright position, said pin (60) and said deflector (62) tiltable when feed is flowing through said upper funnel (58), said pin (60) and said deflector (62) reverting to said substantially upright position after the feed ceases to flow, said second reed switch (64) communicating a status of said deflector (62) to said computer controller (68), wherein said alarm (74) is activatable by said computer controller (68) if the blockage is detected by said second reed switch (64).

9. The electronic feeding system (2) of claim 8, wherein said detector comprises a magnet tray (52) comprising a plurality of magnets (54), said magnet tray (52) rotatable with said dosage tray (46), said detector further comprising a first reed switch (56) adjacent to said motor (36), said first reed switch (56) aligned with a rotational path of said plurality of magnets (54), said detector further communicating a status of the rotation of said magnet tray (52) to said computer controller (68).

10. An electronic feeding system (2), comprising:
a computer controller (68);
a central feed storage;
a feed delivery system;
at least one individual feeding station (4) comprising an animal feeder (6), a feeding bowl (8) and an animal identifier (9), said animal feeder (6) comprising:
a reservoir (10) for receiving feed from said feed delivery system, said reservoir (10) comprising an agitator (44) for agitating the feed inside said reservoir (10) and a dosage tray (46);
a motor assembly (14), said motor assembly (14) comprising a motor (36) actuatable by said computer controller (68), said motor rotating said agitator (44) and said dosage tray (46) such that said dosage tray receives a pre-determined dosage of feed from said reservoir (10), said motor assembly (14) further comprising a detector for detecting a rotation of said dosage tray (46) and communicating a status of the rotation of said dosage tray (46) to the computer controller (68); and
a funnel assembly (16) comprising an upper funnel (58) for transferring feed from said reservoir (10) to said feeding bowl (8); and
an alarm (74), said alarm (74) activatable by said computer controller (68) if a blockage is detected by said detector;
wherein said funnel assembly (16) further comprises a pin (60) operatively coupled at a lower end thereof to an outlet of said upper funnel (58) and a deflector (62) coupled to an upper end of said pin (60), said pin (60) and said deflector (62) in a substantially upright position when no feed is flowing, said pin (60) and said deflector (62) tiltable when feed is flowing through said upper funnel (58), said pin (60) and said deflector (62) reverting to said substantially upright position after the feed ceases to flow, wherein said alarm (74) is activatable by said computer controller (68) if the blockage is detected by one of doppler effect detection, capacitive proximity sensor detection, laser light flow detection, or microwave sensor detection.

11. The electronic feeding system (2) of claim 8 further comprising a cap assembly (12), said cap assembly (12) covering said reservoir (10) and transferring feed from said feed delivery system to said reservoir (10), said cap assembly (12) comprising a feed shut-off (30) engageable by said computer controller (68).

12. The electronic feeding system (2) of claim 8, wherein said motor assembly (14) further comprises an amperage meter (72) for detecting a drawn current by said actuating motor (36), said amperage meter (72) communicating said drawn current to the computer controller (68), said computer controller (68) comparing said drawn current to a drawn current threshold to determine a quantity of feed remaining in said reservoir (10).

13. The electronic feeding system (2) of claim 8, wherein said funnel assembly (16) further comprises a lower funnel (66) for diverting feed from said upper funnel (58) to the feeding bowl.

14. The electronic feeding system (2) of claim 12 further comprising a computer storage (70) operatively connected to said computer controller (68), said computer storage (70) comprising data selected from at least one of animal identification information, a plurality of individual feeding programs, or motor current thresholds.

* * * * *